US006607138B2

United States Patent
Saeki

(10) Patent No.: US 6,607,138 B2
(45) Date of Patent: Aug. 19, 2003

(54) COMMUNICATION METHOD OF IC CARD READER/WRITER

(75) Inventor: Kazuto Saeki, Shimosuwa-machi (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/151,773

(22) Filed: May 20, 2002

(65) Prior Publication Data

US 2003/0006279 A1 Jan. 9, 2003

(30) Foreign Application Priority Data

May 22, 2001 (JP) ........................................ 2001-153145

(51) Int. Cl.[7] .............................................. G06K 19/06
(52) U.S. Cl. ...................................... 235/492; 235/487
(58) Field of Search ................................. 235/492, 487

(56) References Cited

U.S. PATENT DOCUMENTS 4,833,595 A * 5/1989 Iijima ........................ 235/492

FOREIGN PATENT DOCUMENTS

JP          01-213774        8/1989

* cited by examiner

Primary Examiner—Harold I. Pitts
(74) Attorney, Agent, or Firm—Reed Smith LLP

(57) ABSTRACT

A communication method of an IC card reader/writer which transmits a telegraphic message from a host device to an IC card or from said IC card to said host device is disclosed. The host device divides the data into blocks, each of which is of a size smaller than the capacity of a memory device equipped in said IC card reader/writer to transmit said data to IC card reader/writer, and attaches a code to each of said data blocks to indicate whether or not the block is the final data block.

5 Claims, 5 Drawing Sheets

COMMUNICATION METHOD OF IC CARD READER/WRITER

This application claims foreign priority under 35 U.S.C. §119 to JP 2001-153145 filed May 22, 2001.

FIELD OF THE INVENTION

The present invention relates to a communication method of an IC card reader/writer and, more specifically, to a communication method of an IC card reader/writer which transmits a telegraphic message from a host device to an IC card or a telegraphic message from an IC card to a host device.

2. Background of the Invention

A host device such as a host computer normally uses an IC card reader/writer for communicating with contact-type IC cards. FIG. 5 shows a sequence of a traditional communication of an IC card reader/writer that stands between a host device and an IC card for data communication.

The IC card reader/writer receives from the host device the entire telegraphic message that needs to be transmitted to the IC card (see code 101) and temporarily stores it in the RAM (Random Access Memory) therein. Then, the IC card reader/writer converts the telegraphic message stored in the RAM in a telegraphic format by which the message can be communicated with the IC card. This telegraphic format is specified by the International Standard or the Domestic Standard. For example, the T=0 protocol and the T=1 protocol specified by the International Standard are well known.

In the communication between the IC card reader/writer and the IC card, a one-time transmissible data length is predetermined. Therefore, when the data length the IC card reader/writer has received from the host device is longer than the predetermined length, the data communication between the IC card reader/writer and the IC card is divided into multiple transmissions (Code 102). Note that Laid-open Patent Application H1-213774 has disclosed the technology used for dividing the data, which the IC card reader/writer has received from the host device, to transmit the data of a predetermined length to the IC card.

The IC card reader/writer transmits all the data from the host device to the IC card, and then receives a response from the IC card (for example, a response information indicating a successful writing of the data on the IC card). Even for the transmission of the response information, if the length of the response information is longer than a predetermined length, the data communication between the IC card reader/writer and the IC card is divided into multiple transmissions (Code 103).

Then, the IC card reader/writer saves all the response data from the IC card in the RAM. After the communication with the IC card is completed, the IC card reader/writer sends the response data, which it has received from the IC card, to the host device collectively (Code 104).

In recent years, the memory capacity of IC cards and the communication capacity have been made larger. This has made the maximum length of the telegraphic message of IC card larger. Initially, the maximum length of the IC card telegraphic message was 261 bytes; however, the communication by 4K (4096) bytes and 8K (8192) bytes is now possible. In the future, a much larger communication capacity is expected to be made possible.

The conventional communication method of an IC card reader/writer described above does, however, have significant drawbacks. In particular, the conventional communication method requires the card reader/writer to equip more RAM that can manage the communication with IC cards having larger memory capacities. However, it may be impossible to upgrade the RAM capacity to 4K bytes, 8K bytes or more, depending on the CPU capacity. In such a case, the CPU needs to be replaced with an upgraded one. Even if the additional RAM may be installed, it can be costly. Also, even the CPU upgrade and additional RAM may not be sufficient for the IC card reader/writer to process the future IC cards which would have more communication capacities.

In view of the foregoing, there currently exists a need for a communication method of an IC card reader/writer which is capable of processing IC cards having larger communication capacities without requiring the CPU upgrade or the additional RAM.

SUMMARY OF THE INVENTION

It is accordingly an object of the present invention is to provide a communication method of an IC card reader/writer which is capable of processing IC cards having larger communication capacities without requiring the CPU upgrade or the additional RAM.

To achieve the above, the present invention is a communication method of an IC card reader/writer which transmits a telegraphic message from a host device to an IC card or from the IC card to the host device, wherein the host device divides the data into blocks, each of which is of a size smaller than the capacity of a memory device equipped in the IC card reader/writer, to transmit the data to IC card reader/writer, and attaches a code to each of the data blocks to indicate whether or not the block is the final data block.

Therefore, the IC card reader/writer receives from the host device the data blocks of a capacity that does not exceed the size of the memory device equipped therein, stores them in the memory device, and performs a predetermined process. In other words, the IC card reader/writer receives from the host device the data blocks, each of which is of a communication capacity storable in the memory device. Consequently the memory size of the IC card reader/writer does not affect the maximum communication capacity. Also, a code is attached to each of the data blocks to indicate whether or not the data block is the final data block. Thus, the IC card reader/writer is capable of determining whether or not there is a successive data block.

The invention may also be a communication method of an IC card reader/writer, wherein the IC card reader/writer stores the data blocks from the host device in the memory device to process, confirms that there is a successive data block and prompts the host device to send the successive data block; and then the host device sends the successive data block to the IC card reader/writer, responding to the prompt.

Therefore, the communication between the IC card reader/writer and the host device is performed within the communication capacity storable in the memory device equipped in the IC card reader/writer.

Thus, the memory size of the IC card reader/writer would not affect the maximum communication capacity.

The invention may also be a communication method of an IC card reader/writer, which transmits a telegraphic message from a host device to an IC card or from the IC card to the host device, the IC card reader/writer stores the data blocks from the IC card up to the capacity that does not exceed the size of a memory device equipped in the IC card reader/ writer and sends the stored-up data to the host device collectively, and also attaches a code to the collective data, which is to be transmitted to the host device, to indicate whether or not it is the final data.

Therefore, the communication between the IC card reader/writer and the host device is performed within the communication capacity storable in the memory device equipped in the IC card reader/writer. Thus, the memory size of the IC card reader/writer does not affect the maximum communication capacity. Further, a code is attached to each of the collective data to indicate whether or not it is the final collective data. Thus, the host device can determine whether or not there is the successive data.

In accordance with one embodiment of the invention, a communication method of the IC card reader/writer is disclosed wherein, the host device divides the data into blocks of a size smaller than the capacity of a memory device equipped in the IC card reader/writer to transmit the data to the IC card reader/writer, and attaches a code to each of the data blocks to indicate whether or not the block is the final data block. Therefore, the memory size of the IC card reader/writer does not affect the maximum capacity of a series of data communications between the IC card and the host device. Consequently there is no need of upgrading the hardware such as the CPU and the memory device equipped in the IC card reader/writer, but only the software may be replaced to manage a larger communication capacity inexpensively and easily.

In accordance with another embodiment of the invention, a communication method of the IC card reader/writer is disclosed wherein, the IC card reader/writer stores the data blocks from the host device in the memory device, checks if there is a successive data block and prompts the host device to send the next data block if there is; and then the host device sends the successive data block to the IC card reader/writer, responding to the prompt. Therefore, the communication between the IC card reader/writer and the host device can be performed by multiple transmissions such that the data is divided into blocks, each of which has a communication capacity storable in the memory device equipped in the IC card reader/writer. Consequently the memory size of the IC card reader/writer does not affect the maximum capacity of a series of data communications between the IC card and the host device. Also, there is no need of upgrading the hardware such as the CPU and the memory device equipped in the IC card reader/writer, but only the software may be replaced to manage a larger communication capacity inexpensively and easily.

In accordance with even yet another embodiment of the disclosed invention, a method of the IC card reader/writer is disclosed wherein, the IC card reader/writer stores data blocks from the IC card up to the capacity that does not exceed the size of a memory device equipped in the IC card reader/writer and sends the stored-up blocks to the host device collectively, and also attaches a code to the collective data, which is to be transmitted to the host device, to indicate whether or not it is the final data. Therefore, the memory size of the IC card reader/writer does not affect the maximum capacity of a series of data communications between the IC card and the host device. Consequently there is no need of upgrading the hardware such as a CPU and a memory device equipped in the IC card reader/writer, but only the software may be replaced to mange a larger communication capacity inexpensively and easily.

DETAILED DESCRIPTION OF THE INVENTION

Figure 1:
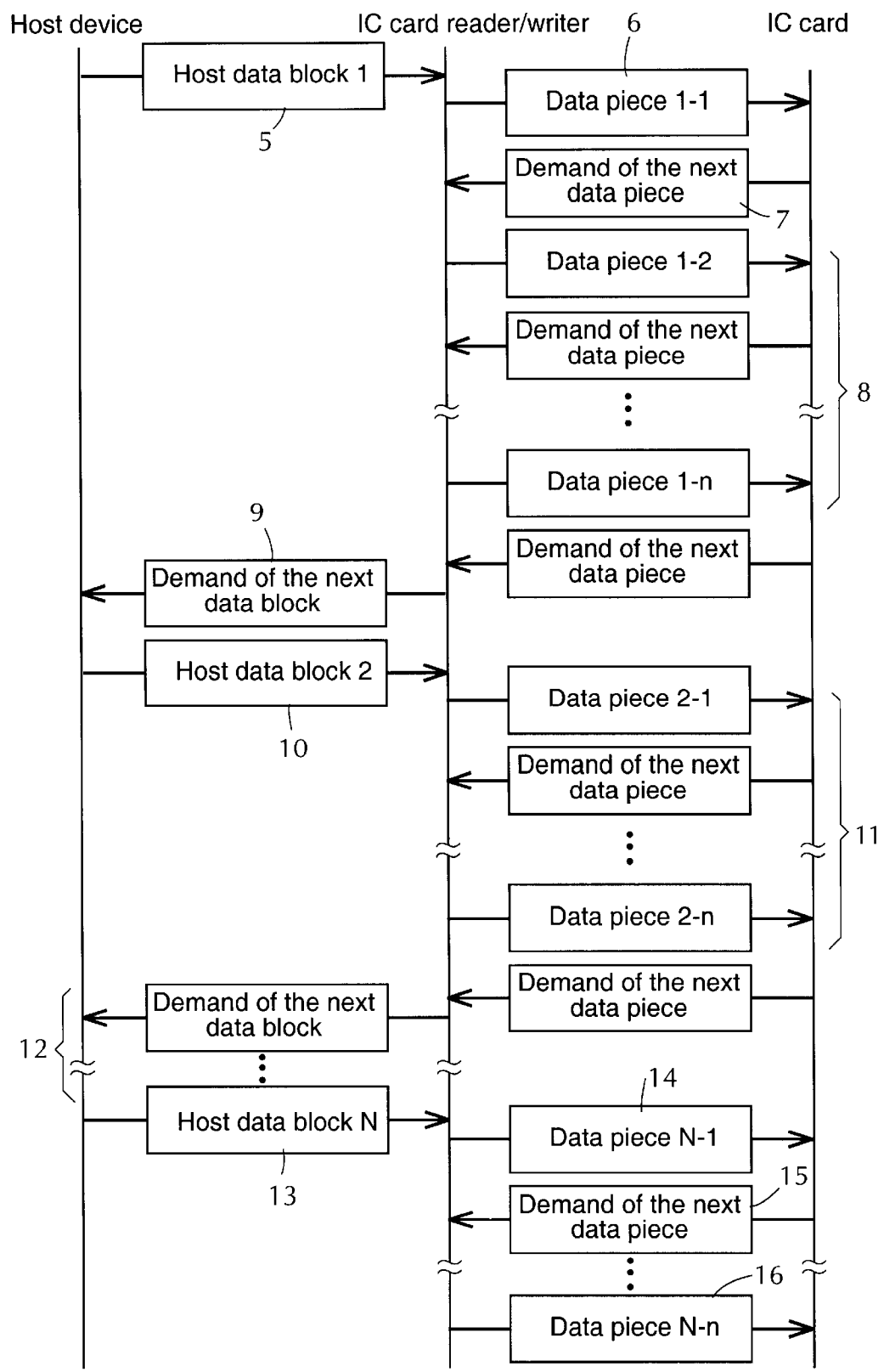
FIG. 1 is a chart of an example of the sequence of the communication between the host device, the IC card reader, and the IC card in an embodiment of a communication method of an IC card reader/writer of the present invention.

FIGS. 1 through 4 show an embodiment of a communication method of an IC card reader/writer developed in accordance with the present invention. Referring to FIGS. 1 through 4, the present invention is a communication method of IC card reader/writer 1, which transmits a telegraphic message from host device 2 to IC card 3 or a telegraphic message from IC card 3 to host device 2. Host device 2 divides the data into the data blocks of a length that does not exceed the capacity of memory device 4 of IC card reader/writer 1, and attaches a code to each of the data blocks to indicate whether or not the data block is the final block.

IC card reader/writer 1 stores the data blocks from host device 2 in memory device 4, confirms from the code that there is a successive data block and prompts host device 2 to send the successive data block. Responding to the prompt, host device 2 sends the successive data block to IC card reader/writer 1.

Also, IC card reader/writer 1 stores the data blocks from IC card 3 up to the length that does not exceed the capacity of memory device 4 of IC card reader/writer 1, transmits the stored-up data blocks to host device 2 collectively, and attaches a code to the collective data, which is to be transmitted to host device 2, to indicate whether or not the collective data is the final data.

An example of host device 2 is a host computer. IC card 3 is a contact-type IC card equipped with control devices such as a non-volatile memory, a CPU, etc. IC card reader/writer 1 writes and reads data with respect to IC card 3, according to the command message from host device 2 or the response message from IC card 3. IC card reader/writer 1 also has a memory device (buffer) 4 that temporarily saves a telegraphic message from host device 2 or a telegraphic message from IC card 3. An example of the memory device is RAM 4 which is used herein.

The hardware configurations of host device 2, IC card reader/writer 1 and IC card 3 remain the same as those of normal hardware. In this embodiment, the software installed in host device 2 and IC card reader/writer 1 is modified in order to perform the following steps.

In other words, host device 2 is designed such that the memory capacity of the memory device (RAM 4 in this embodiment) of IC card reader/writer 1 can be entered in a program thereof in advance. When the size of the data, which needs to be transmitted from host device 2 to IC card reader/writer 1 (hereinafter denoted as the host data), is bigger than the memory capacity of RAM 4 of IC card reader/writer 1, host device 2 divides the host data into data blocks of a predetermined length that does not exceed the memory capacity and sends them. In this embodiment, the host data is divided into N data blocks by host device 2, and the blocks are called host data blocks 1 to N in the order of transmission.

Further, host device 2 attaches a code to each of the host data blocks 1 to N to indicate whether or not the data block is the final block. The code is a flag of 1 bit. Then, the flag is called a data final flag. When the data block has the data final flag of "0", there is a successive data block following the data block. On the other hand, when the data block has the data final flag of "1", the data block is the final block. Therefore, among N host data blocks 1 to N, only the final host data block N has the data final flag of "1", and other blocks have the flag of "0". IC card reader/writer 1, which has received a host data block, determines from the data final flag attached to the block if there is a successive data block or if the block is the final block.

IC card reader/writer 1 saves the host data block from host device 2 in RAM 4, and converts the host data block saved in RAM 4 in a telegraphic message format for communicating it with IC card 3. The communication between IC card reader/writer 1 and IC card 3 is performed by a conventional communication method, in which a T=1 protocol, for instance, is given. At that time, if necessary, IC card reader/writer 1 further divides the host data block into pieces of a given length, which is determined by the protocol. In this embodiment, the host data block X is further divided into n pieces, which are called data pieces X-1 to X-n in the order of transmission.

Also, IC card reader/writer 1 receives a response from IC card 3 (for example, the response information indicating that the information is written on IC card 3 successfully). When the response information to be sent by IC card 3 is longer than the length predetermined by the protocol, the communication between IC card reader/writer 1 and IC card 3 is divided into multiple transmissions. In this embodiment, each of the divided responses is called a response block.

IC card reader/writer 1 of this embodiment stores the response blocks from IC card 3 in RAM 4 up to a predetermined capacity that does not exceed the capacity of RAM 4, and sends the response blocks collectively to host device 2 when the stored-up blocks reach the predetermined capacity. In this embodiment, the response information to be sent by IC card reader/writer 1 to host device 2 is called the response to host. When the total of the response blocks to be sent by IC card 3 exceeds the memory capacity of RAM 4 of IC card reader/writer 1, the response to host is sent through multiple transmissions. Also, the response to host is divided into N blocks, which are called the response blocks to host 1 to N in the order of transmission. The n data pieces that compose a response block to host X are called the response data pieces X-1 to X-n.

IC card reader/writer 1 attaches a code to each of the response blocks to host to indicate whether or not it is the final response block to host. The code is a flag of 1 bit. Hereinafter the flag is called the response final flag. For example, when the response final flag is "0", there is a successive response block to host following this response block to host. On the other hand, when the response final flag is "1", the block is the final block. Hence, only the last response block to host N has the response final flag of "1" and other blocks have the flag of "0". Host device 2, which has received the response block to host, determines from the response final flag attached to the block if there is a successive response block or the block is the final block.

Figure 2:
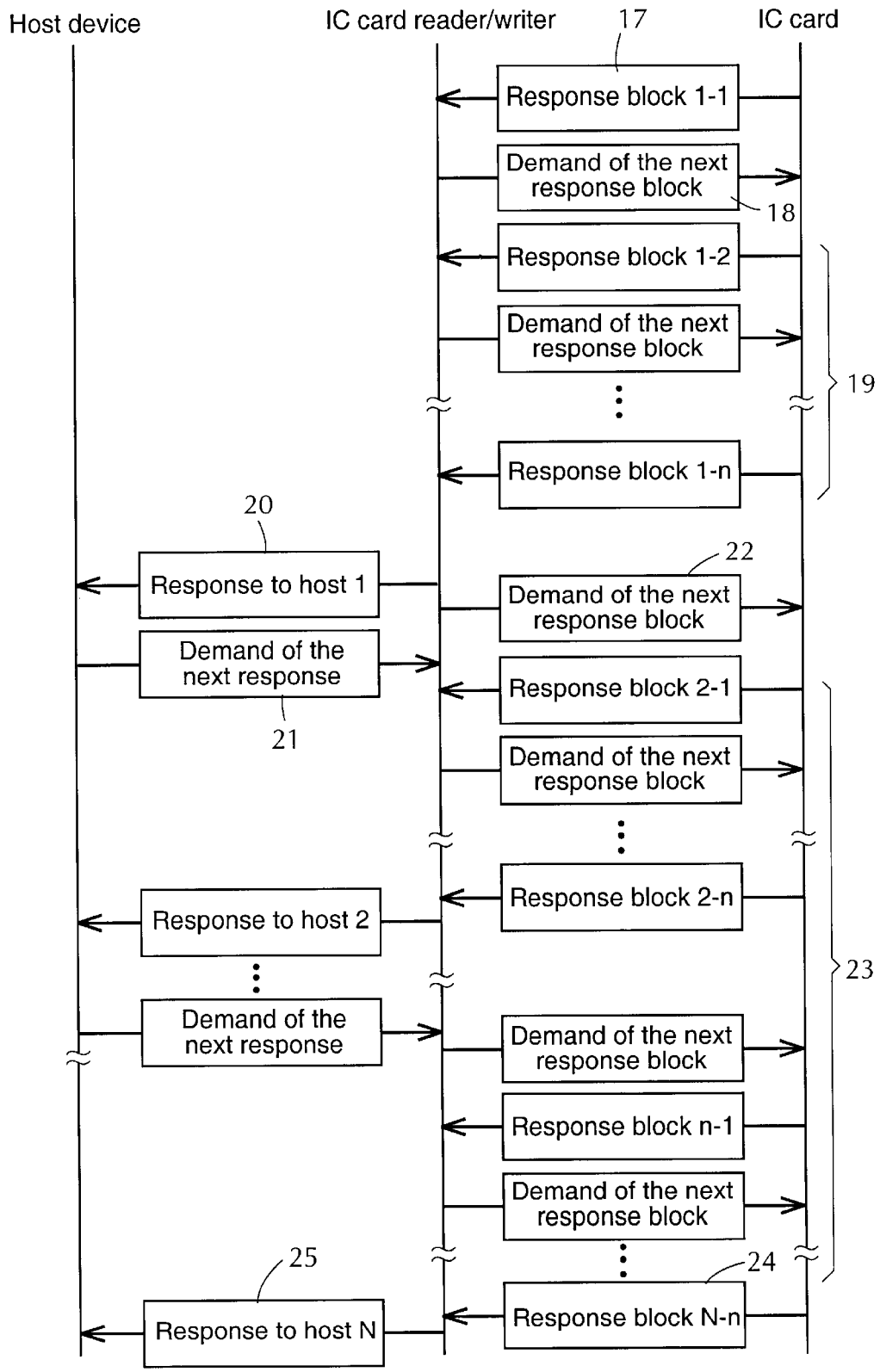
FIG. 2 is a chart of an example of the sequence of the communication between the IC card reader/writer and the IC card.
Figure 3:
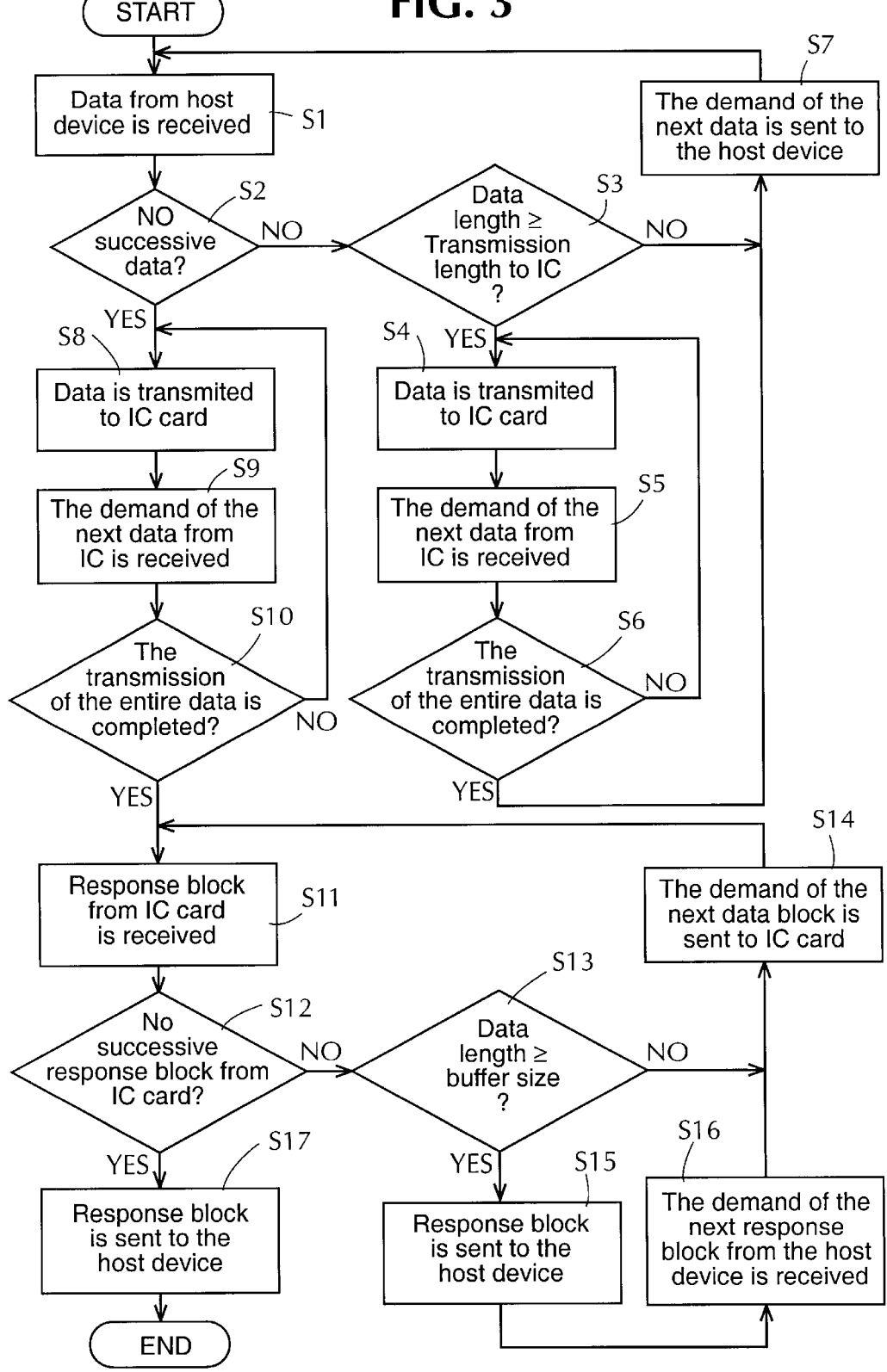
FIG. 3 is a flowchart of an example of the steps that the IC card reader/writer performs in the embodiment of the communication method of the IC card reader/writer of the present invention.
Figure 4:
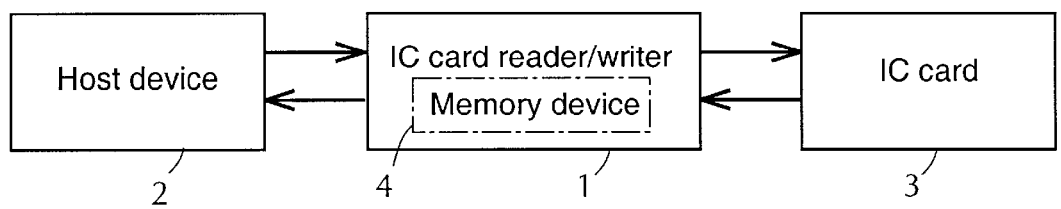
FIG. 4 is a block diagram of the embodiment of the communication method of the IC card reader/writer of the present invention.
Figure 5:
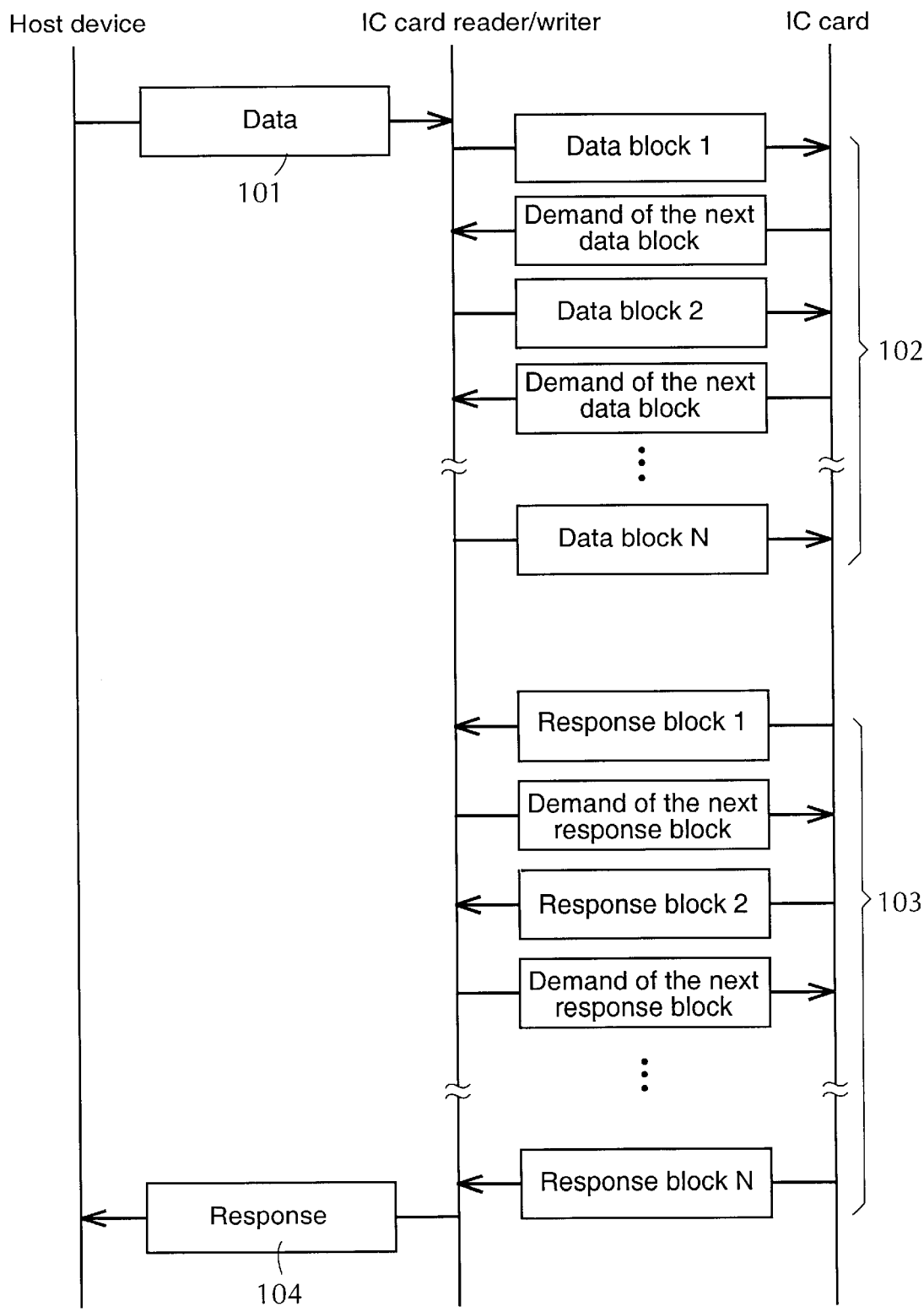
FIG. 5 is a chart of a sequence of a conventional communication between a host device, an IC card reader/writer, and an IC card.

FIGS. 1 and 2 show an example of a sequence of the communication among host device 2, IC card reader/writer 1 and IC card 3, and FIG. 3 is a flowchart of an example of the process of IC card reader/writer 1 when the communication is performed. An embodiment of a communication method of the present invention is described based on the figures.

IC card reader/writer 1 receives the first host data block 1 from host device 2 (Step 1 in FIG. 3, Code 5 in FIG. 1). The first host data block 1 is saved in RAM 4. IC card reader/writer 1 checks the data final flag of the data block 1 to determine whether or not there is a successive data block following the data block 1 (Step 2). The data final flag attached to the block 1 indicates that there is a successive data block (Step 2; No). Next, IC card reader/writer 1 determines whether or not the data length of the host data block 1 is longer than the length of the transmission to IC card 3 which is determined by a protocol (Step 3). If the data length does not exceed the predetermined length of the transmission to IC card 3 (Step 3; No), IC card reader/writer 1 prompts host device 2 to send the next block (Step 7). In this embodiment, the data length of the host data block 1 is longer than the predetermined length of the transmission to IC card 3 (Step 3; Yes), and IC card reader/writer 1 starts the transmission with IC card 3 in the following steps. The data block 1 saved in RAM 4 is divided into n data pieces 1-1 to 1-n of a predetermined length, and the first piece 1-1 is sent (Step 4, code 6). IC card 3, which has received the first data piece 1-1, prompts IC card reader/writer 1 to send the next data piece (Step 5, Code 7). IC card reader/writer 1, responding to the demands from IC card 3, repeats the data piece transmissions until the entire data block 1 saved in RAM 4 is transmitted, i.e., until the last data piece 1-n is transmitted (Step 6;No, Step 4, Step 5, Code 8). When IC card reader/writer 1 completes the transmission of the data 1 that has been saved in RAM 4 (Step 6; Yes), it pauses the communication with IC card 3 and prompts host device 2 to send the next data block (Step 7, Code 9).

Host device 2 sends host data block 2, responding to the prompt by IC card reader/writer 1, and IC card reader/writer 1 receives data block 2 (Step 1, Code 10). IC card reader/writer 1 saves host data block 2 in RAM 4 and checks the data final flag to determines whether or not there is a successive data block following the data block 2 (Step 2). Since the data final flag attached to the data block 2 indicates that there is a successive data block, (Step 2; No), the same steps as in the transmission of data block 1 are performed (Step 3 to Step 7, Code 11). Thus, IC card reader/writer 1 repeats the same steps as in the transmission of data block 1 until it receives the final telegraphic message block, that is, the host data block N, from host device 2 (Code 12).

Finally, IC card reader/writer 1 receives the final telegraphic message, that is, host data block N, from host device 2 (Step 1, Code 13). IC card reader/writer 1 saves host data block N in RAM 4 and checks the data final flag attached to the block N to determine if there is a successive data block following data block N (Step 2). The data final flag indicates that there is no successive data block (Step 2; Yes). Then, IC card reader/writer 1 divides data block N saved in RAM 4 into n data pieces N-1 to N-n of a predetermined length, and transmits the first data piece N-1 (Step 8, Code 14). IC card 3 receives the data piece N-1 and sends the demand of the next data piece, and IC card reader/writer 1 receives the demand (Step 9, Code 15). Responding to the demands, IC card reader/writer 1 repeats the transmissions of the data pieces until the entire host data block N stored in RAM 4, that is, the last data piece N-n, is transmitted (Step 10; No, Step 8, Step 9). The transmission of the host data from host device 2 to IC card 3 is completed with the last data piece N-n (Step 10; Yes, Code 16).

Then, IC card reader/writer 1 starts to receive the first response block 1-1 from IC card 3 (Step 11, Code 17 in FIG. 2). IC card reader/writer 1 saves the first response block 1-1 in RAM 4 and checks a predetermined flag contained in the response block 1-1 according to the protocol to determine if there is a successive response block from IC card 3 (Step 12). When the flag indicates that there is a successive response block from IC card 3 (Step 12; No), IC card reader/writer 1 determines whether or not the total data amount of the response block stored in RAM 4 exceeds a predetermined buffer size (Step 13). In other words, IC card reader/writer 1 determines if the next response block 1-2 can be saved in RAM 4 consecutively. When it determines that the response block 1-2 can be stored in RAM 4 consecutively (Step 13; No), it prompts IC card 3 to send the next response block (Step 14, Code 18).

IC card reader/writer 1 repeats the steps of receiving the response blocks from IC card 3 and of prompting IC card 3 to send the successive response blocks until the total data amount of the response blocks in RAM 4 reaches a predetermined buffer size (Code 19). When the total data amount of the response blocks in RAM 4 has reached the predetermined buffer size (Step 13; Yes), IC card reader/writer 1 pauses the communication with IC card 3 temporarily, collects the response blocks 1-1 to 1-n that has stored in RAM 4 as response block to host 1 and sends it to host device 2 (Step 15, Code 20).

Upon receiving the response block to host 1, host device 2 checks the response final flag to determine if there is a successive response block to host. Host device 2 determines that there is a successive response block to host following the response block to host 1, and then prompts IC card reader/writer 1 to send the next response block to host (Code 21). Receiving the prompt by host device 2, IC card reader/writer 1 starts the communication with IC card 3. In other words, it starts to prompt IC card 3 to send the next response block (Step 14, Code 22). Until it receives the final response block N-n from IC card 3, IC card reader/writer 1 repeats the same steps as for the response block to host 1 (Code 23).

Finally, IC card reader/writer 1 receives the final response block N-n from IC card 3 (Step 11, Code 24). IC card reader/writer 1 saves the response block N-n in RAM 4 and checks a predetermined flag included in the response block N-n according to the protocol to determine if there is a successive response block from IC card 3 (Step 12). Since it is understood that the response block N-n is the final block and that there is no successive block (Step 2; Yes), IC card reader/writer 1 collects all the response blocks N-1 to N-n saved in RAM 4 as response block to host N, and sends the final response block N to host device 2 (Step 17, Code 25).

Receiving the response block to host N, host device 2 checks the response final flag and identifies the host response block to host N as the final response block. With this, the transmissions of all the data from IC card 3 to host device 2 are completed.

According to the communication method of IC card reader/writer 1 of the present invention, which performs the above-described process, the size of RAM 4 does not affect the maximum capacity of a series of communications between IC card 3 and host device 2. Thus, there is no need of upgrading the hardware such as the CPU and RAM 4 equipped in IC card reader/writer, but only the software may be replaced to manage a larger communication capacity easily and inexpensively.

Note that although the above mentioned embodiment is a preferred example of the present invention, it is not limited to this. The embodiment can be modified in various ways within the scope of the present invention. For example, the present invention may also be applied to process non-contact type IC cards.

What is claimed is:

1. A communication method of an IC card reader/writer which transmits a telegraphic data message from a host device to an IC card or from said IC card to said host device comprising the steps of:
   dividing in said host device said telegraphic data message into data blocks each of which is of a size smaller than the capacity of a memory device equipped in said IC card reader/writer;
   transmitting said data blocks to said IC card reader/writer; and
   attaching a code to each of said data blocks to indicate whether or not the block is a final data block.

2. The communication method of an IC card reader/writer of claim 1, further comprising the steps of:
   storing said data blocks from said host device in said memory device equipped in said IC card reader/writer;
   confirming from said code that there is a successive data block;
   prompting said host device to send said successive data block; and
   sending said successive data block from said host device to said IC card reader/writer to respond to said prompting.

3. A communication method of an IC card reader/writer, which transmits a telegraphic message from a host device to an IC card or from said IC card to said host device comprising the steps of:
   storing in said IC card reader/writer said data blocks from said IC card up to a capacity that does not exceed the size of a memory device equipped in said IC card reader/writer;
   sending said stored data blocks to said host device collectively to form collective data and providing a code with said collective data wherein said code indicates whether or not said collective data is the final collective data to be sent.

4. A method for data transfer between a host device, an IC card reader/writer with a memory device and an IC card comprising the steps of:
   programming the host device to send host data to the IC card reader/writer, the host data being of a predetermined length which does not exceed a memory capacity of the memory device;
   sending a first host data block from the host device to the IC card reader/writer with the memory device;
   assigning a number, 1-n, to each host data block sent;
   attaching a data flag to each host data block to indicate if the host data block is a final data block sent;
   converting the host data blocks in the IC card reader/writer using a data protocol;
   sending a write message according to the data protocol from the IC card reader/writer to the IC card; and
   prompting the host device to send a next number (1-n) host data block to the IC card reader/writer until the final data block is sent.

5. The method of claim 4 further comprising the steps of:
   receiving a response in the IC card reader/writer from the IC card, wherein if the response contains data which is too long to be stored in the memory of the IC card reader/writer, the IC card reader/writer performs the additional steps of dividing the response into response data blocks and sending the response data blocks to the host device in multiple transmissions.

* * * * *